(12) United States Patent
Oppermanm

(10) Patent No.: US 7,318,302 B2
(45) Date of Patent: Jan. 15, 2008

(54) EQUIPMENT SUPPORT FOR A METAL BUILDING

(75) Inventor: R. Scott Oppermanm, Everman, TX (US)

(73) Assignee: Opperman Investments, Ltd., Everman, TX (US)

( * ) Notice: Subject to any disclaimer, the term of this patent is extended or adjusted under 35 U.S.C. 154(b) by 755 days.

(21) Appl. No.: 10/770,779

(22) Filed: Feb. 3, 2004

(65) Prior Publication Data

US 2005/0005554 A1 Jan. 13, 2005

Related U.S. Application Data

(60) Provisional application No. 60/486,116, filed on Jul. 10, 2003.

(51) Int. Cl.
*E04B 1/18* (2006.01)
*E04B 5/18* (2006.01)

(52) U.S. Cl. .................. 52/633; 52/220.1; 52/733.2; 52/27; 52/38; 52/737.6; 428/603; 428/529; 428/599; 248/58; 248/124.1; 248/68.1; 248/49

(58) Field of Classification Search ............... 428/603, 428/529, 599; 52/27, 38, 220.1, 633, 220.4, 52/537, 200, 720.1, 739.1, 740.3, 733.2, 52/737.6, 36.4, 36.5, 783.16, 783.19; 248/58, 248/124, 124.1, 393, 68.1, 49; 403/167, 403/85, 84; 256/31

See application file for complete search history.

(56) References Cited

U.S. PATENT DOCUMENTS

| | | | | |
|---|---|---|---|---|
| 3,094,197 A | * | 6/1963 | Attwood | 52/100 |
| 3,284,971 A | * | 11/1966 | Attwood | 52/100 |
| 3,606,019 A | * | 9/1971 | Dubiel | 211/26 |
| 5,187,912 A | * | 2/1993 | Hsueh | 52/36.5 |
| 5,669,260 A | * | 9/1997 | Stampfl et al. | 72/177 |
| 5,927,041 A | * | 7/1999 | Sedlmeier et al. | 52/730.1 |
| 6,114,012 A | * | 9/2000 | Amaoka et al. | 428/182 |
| 6,290,426 B1 | * | 9/2001 | van Gijsel et al. | 403/374.3 |
| 6,511,028 B1 | * | 1/2003 | Gretz | 248/222.52 |
| 2001/0004099 A1 | * | 6/2001 | Onishi | |
| 2002/0020140 A1 | * | 2/2002 | Sucre | |
| 2002/0100843 A1 | * | 8/2002 | Schmidt | |
| 2003/0089828 A1 | * | 5/2003 | Korczak et al. | |

OTHER PUBLICATIONS

Tyco International, Ltd. (http:www.tycoelectrical.com/pdf/ps_channel.pdf).*

* cited by examiner

*Primary Examiner*—Victor Batson
*Assistant Examiner*—Jerome B Myers
(74) *Attorney, Agent, or Firm*—Bracewell & Giuliani LLP

(57) ABSTRACT

A device for supporting equipment on a wall panel having protruding ribs. Channels are mounted perpendicular to the ribs. The channel has a base wall, and a pair of side walls extending outward from the base wall. The channel also has an outward wall portion communicating with the side walls at a distance from the base wall. Several apertures are defined in each channel. The apertures have a pair of side wall portions and a base wall portion. When the channel is positioned on the wall panel, the apertures receive the protruding ribs. A fastening structure is located on the base wall of the channel for mounting the channel to the wall panel. A fastening plate is also located on the outward wall portion of the channel for mounting the equipment to the channel.

13 Claims, 2 Drawing Sheets

EQUIPMENT SUPPORT FOR A METAL BUILDING

RELATED APPLICATIONS

This patent application claims priority to U.S. Provisional Patent Application Ser. No. 60/486,116 filed on Jul. 10, 2003, which is incorporated by reference in its entirety.

FIELD OF THE INVENTION

This invention relates in general to brackets, and in particular to a slotted channel or brace that mounts to a metal building wall for holding electrical equipment.

BACKGROUND OF THE INVENTION

In the field of electrical contracting, it is often necessary for a piece of equipment, such as an electrical panel or a conduit, to be mounted to the outside of a metal building. However, problems arise in many cases where the equipment will not mount flush against the metal wall siding panel, because the metal siding includes vertical ribbing that protrudes from the wall. This vertical ribbing prevents flush mounting of the equipment, especially with respect to pieces of equipment having a substantial width. The problem similarly exists with respect to metal wall siding panels that have incremental ribs with varying degrees of protrusion from the wall.

SUMMARY

A need exists in the art for a device that will effectuate more sustainable mounting capabilities, while optimizing the mating surface area interfaced between the equipment and the surface on which it is mounted. One solution to this problem is a horizontal channel beam. The channel beam would feature grooves on one side corresponding to the protruding ribs, and would attach to the ribbed metal wall siding panel accordingly. The other side of the channel beam would feature an attachment mechanism to secure a piece of equipment to the channel beam, thus producing a successful mount of the piece of equipment to the ribbed wall.

This invention describes a channel device for supporting a piece of equipment, such as an electrical panel or conduit, on a metal wall siding panel having several protruding ribs. The channel has a base wall, and a pair of side walls extending outward from the base wall. The channel also has an outward wall portion communicating with the side walls at a distance from the base wall. Several apertures are defined in the channel. The apertures have a pair of side wall edges that surround the perimeter of the protruding ribs, and a pair of base wall edges that are substantially parallel to the ribs. When the channel is positioned on the metal wall siding panel, the apertures are designed to receive the protruding ribs. Fastening structures exist on either side of the channel. A first fastening structure is located on the base wall of the channel for mounting the channel to the metal wall siding panel. A second fastening structure is located on the outward wall portion of the channel for mounting the equipment to the channel.

The novel features of this invention, as well as the invention itself, will best be understood from the following drawings and detailed description.

DETAILED DESCRIPTION OF THE INVENTION

Although the following detailed description contains many specific details for purposes of illustration, anyone of ordinary skill in the art will appreciate that many vairations and alterations to the following details are within the scope of the invention. Accordingly, the exemplary embodiment of the invention described below is set forth without any loss of generality to, and without imposing limitations thereon, the claimed invention.

Figure 1:
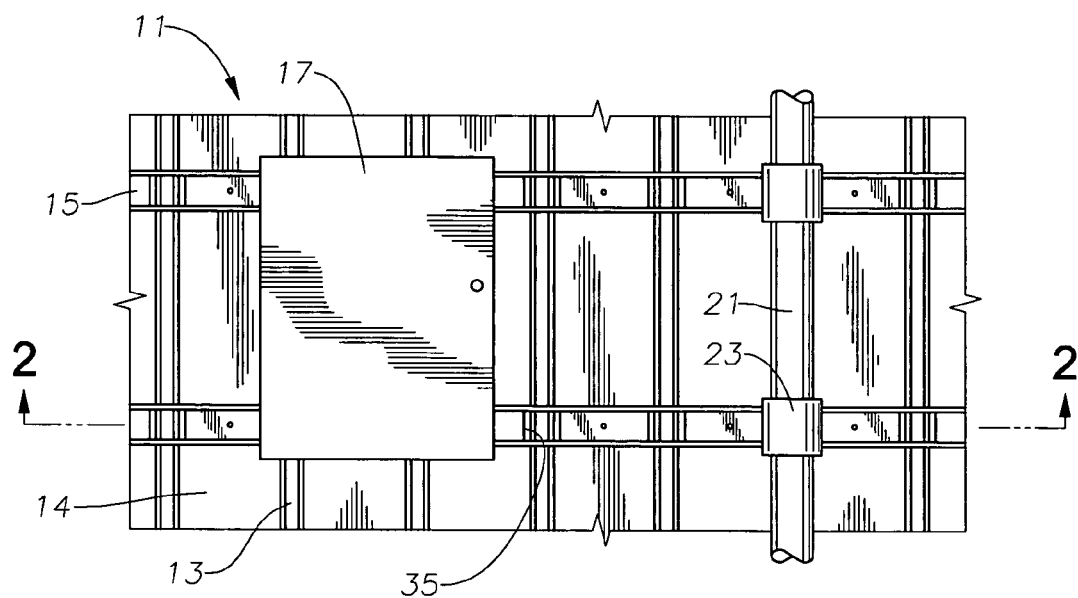
FIG. 1 is a partial front view of a building having slotted channels constructed in accordance with this invention.

Referring to FIG. 1, a building with wall siding panels 11 is shown. Panels 11 have vertical ribs 13 extending parallel to each other and separated by flat base portions 14. Each panel 11 may be approximately 36" wide, with the distance between ribs 13 being about 6". Each rib 13 in this embodiment is generally in the shape of a hat channel with tapered sides and a flat crest. However, the configuration of ribs 13 could differ. Also, panels 11 may have smaller ribs located between larger ribs 13. Panels 11 are typically made of metal but could also be made of plastic.

A pair of braces or slotted channels 15 are shown mounted horizontally to the exterior of wall siding 11. Channels 15 are parallel to each other and perpendicular to ribs 13. Channels 15 will provide support for a variety of equipment. In this embodiment, an electrical panel 17 is shown mounted to channels 15 on the exterior of wall siding 11. Also, by way of example, a wiring conduit 21 is shown secured to channels 15 by pipe clamps 23.

Figure 2:
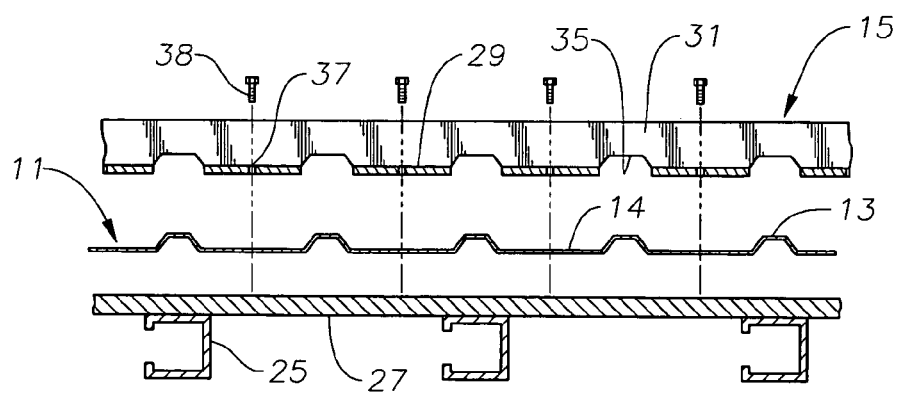
FIG. 2 is an exploded sectional view of the building of FIG. 1 as shown along the line 2-2 of FIG. 1.

Referring to FIG. 2, the metal building has vertical studs 25 spaced apart from each other. Studs 25 may be of a variety of configurations, and in this example are shown to be C-shaped in cross-section. Metal braces 27 typically extend horizontally between studs 25, perpendicular to them. Braces 27 are spaced apart from each other along the lengths of studs 25. Braces 27 are illustrated as being flat, but could have various cross-sectional shapes. Wall siding 11 secures to braces 27 by screws (not shown) that extend through flat base portions 14.

Figure 3:
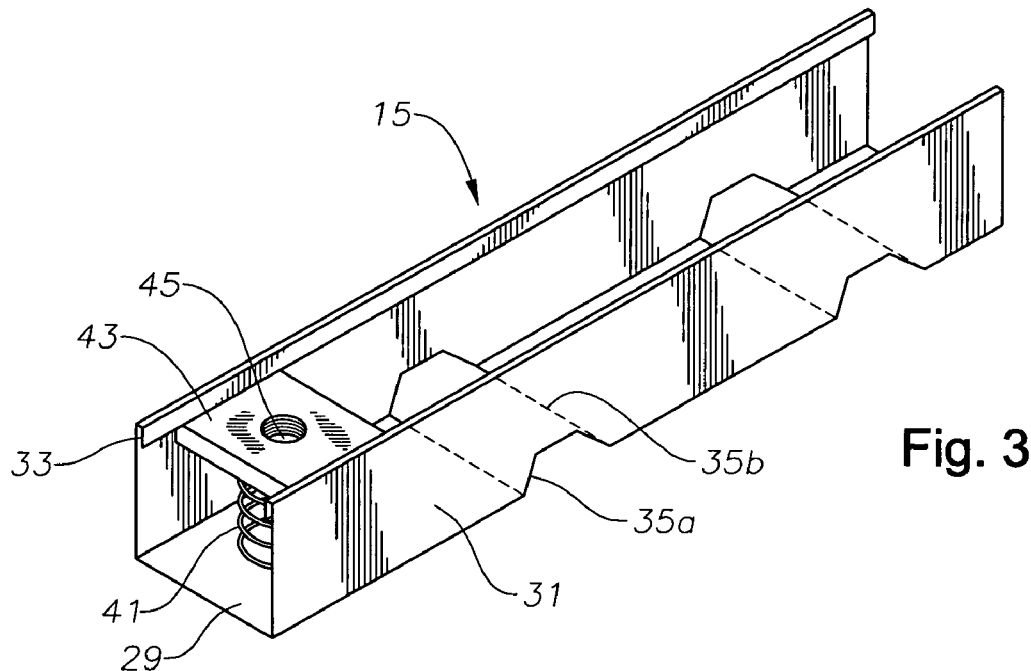
FIG. 3 is an enlarged perspective view illustrating one of the channels of FIG. 1.
Figure 4:
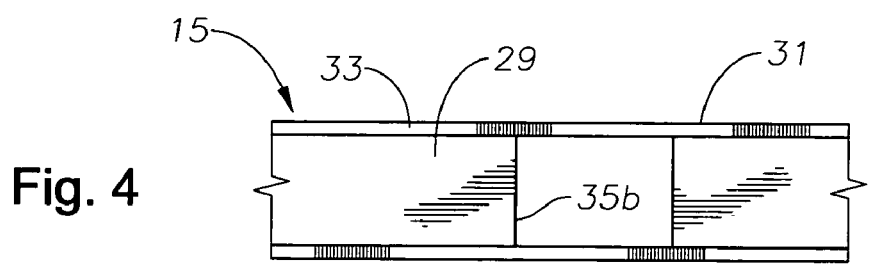
FIG. 4 is a front view of a portion of the channel of FIG. 3.

Referring to FIG. 3, channels 15 may vary in configuration, but preferably comprise a rectangular channel member with the open side or slot facing outward. Channel 15 has a base wall 29 and two parallel side walls 31 that extend from base wall 29 orthogonally. Typically, the free edges of side walls 31 curve over to form lips 33. An open slot is located between lips 33.

To accommodate the protruding ribs 13, a plurality of apertures 35 are formed in channel 15 at the same spacing as ribs 13. Each aperture 35 has a side wall portion 35a that extends partially through each side wall 31. Each side wall portion 35a is larger than the cross-sectional dimension of one of the ribs 13. In this embodiment, each side wall portion 35a is also hat-shaped, with two tapered edges and a flat crest edge, however they could be rectangular. The two side wall portions 35a are joined by a base aperture portion 35b. Base portion 35b is rectangular and has a width greater than the width of ribs 13.

Apertures 35 enable channel 15 to be placed flat against wall panels 11, with the channel base wall 29 flush against the panel base portion 14, as shown in FIG. 2. Screws 38 extend through screw holes 37 and into wall panels 11 and braces 27.

Figure 5:
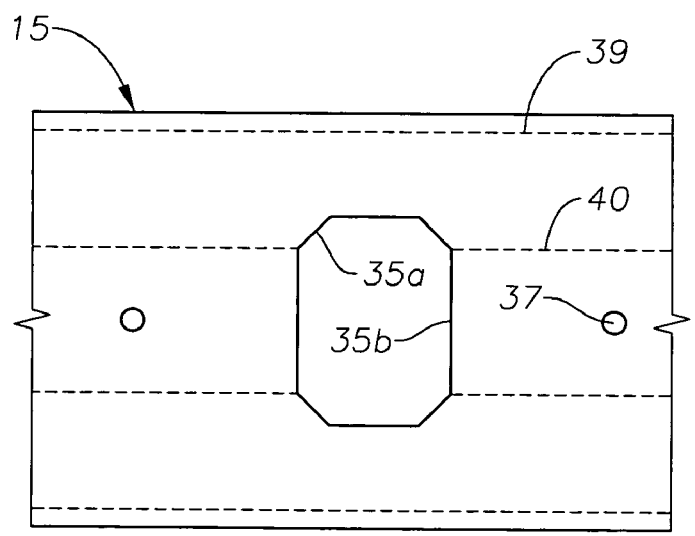
FIG. 5 is an enlarged view of the channel of FIG. 3, shown laid out flat prior to being bent into the rectangular configuration.

Apertures 35 are preferably formed during the manufacturing process for channels 15. Channels 15 are preferably formed by bending flat metal plate. As shown in FIG. 5, each aperture 35, including its two side wall portions 35a and base portion 35b, is cut as a single hole while the plate that forms channel 15 is still flat. This can be done by a punch or some other type of cutting operation. If desired, screw holes 37 could be also punched in base wall 29 to facilitate inserting screws 38 (FIG. 2) to fasten channels 15 to wall panels 11. The plate is bent along fold lines 39 before or after forming apertures 35 to form lips 33 (FIG. 3). After apertures 35 are formed, the plate is bent along fold lines 40 to the rectangular configuration of FIG. 3.

In operation, the building will be constructed conventionally. Wall panels 11 will be installed on the exterior of braces 27. If it is desired to mount external equipment to panels 11, such as electrical panel 17 or conduit 21, channels 15 will be installed. This is done by aligning apertures 35 with ribs 13 and placing base wall 29 of channel 15 in contact with base portions 14 of siding 11. The operator inserts screws 38 to hold channels 15 in place.

Equipment is attached to channels 15 conventionally. FIG. 3 illustrates one type of fastener to fasten panel 17 to channel 15. A spring 41 is urged against a nut plate 43, pushing nut plate 43 against lips 33. The user can slide nut plate 43 along the length of channel 15 to various positions. Nut plate 43 has a threaded hole 45 for receiving a screw. Screws extend through flanges or a back wall of electrical panel 17 (FIG. 1) into engagement with holes 45. Screws also pass through clamps 23 (FIG. 1) and engage other nut plates 43. Rather than nut plates 43, screws could protrude from plate 43.

This invention offers several important advantages. It enables more sustainable mounting of wide pieces of equipment to a ribbed metal wall siding panel. Whereas in the past the protruding ribs prevented wide pieces of equipment from being mounted flush against the wall panel, this invention enables the wide pieces of equipment to be mounted on a long, flat, ribless channel surface that is in turn mounted to the wall panel. Furthermore, by virtue of the apertures created to receive the protruding ribs, the channels may now be manufactured with substantial ease and efficiency relative to past such attempts. The apertures also eliminate excess material from the channel itself, which conserves resources and provides for more a more lightweight structure.

Although the present invention and its advantages have been described in detail, it should be understood that various changes, substitutions, and alterations can be made hereupon without departing from the principle and scope of the invention. Accordingly, the scope of the present invention should be determined by the following claims and their appropriate legal equivalents.

That which is claimed is:

1. In an improved building wall apparatus of the type having at least one panel and containing a plurality of vertically extending ribs, the improvement comprising:

at least one channel having a flat base wall and a pair of parallel side walls extending outward from opposite edges of the base wall;

a lip on each side wall spaced a distance from the base wall;

a plurality of apertures defined in the channel adapted to receive the protruding ribs, each of the apertures having a base wall portion in the base and a side wall portion in each side wall;

a fastener plate mounted to the channel between the side walls, the fastener plate having a threaded aperture adapted to secure the equipment thereto; and an electrical equipment box mounted to the channels by fasteners passing through the box into the fastener plate.

2. The apparatus of claim 1, wherein the base wall portion of each aperture is substantially rectangular.

3. The apparatus of claim 1, wherein the side wall portions of each aperture are hat-shaped, each of the side wall portions comprising two tapered edges and a flat crest edge.

4. The apparatus of claim 1, wherein the fastener plate is slideable longitudinally along the side walls.

5. The apparatus of claim 1, wherein the fastener plate is urged against the lips of the side walls by a spring.

6. The apparatus of claim 1, wherein the height and width of the side wall edges of the apertures are adapted to be greater than the height and width of the ribs protruding from the panel.

7. A method for mounting a piece of equipment to a wall panel having a plurality of protruding ribs, comprising:

(a) providing a channel having a base wall, a pair of side walls extending outward from opposite edges of the base wall, and a plurality of apertures;

(b) positioning the channel to be substantially perpendicular to the ribs;

(c) positioning the apertures to be substantially aligned with the corresponding plurality of protruding ribs;

(d) mounting the channel to the wall panel, and encasing the ribs within the edges of the apertures of the channel; and (e) mounting the equipment to the channel.

8. The method of claim 7, wherein step (a) comprises providing a plurality of apertures, each of the apertures having a base wall portion in the base and a side wall portion in each side wall.

9. The method of claim 7, wherein step (d) comprises mounting the base wall of the channel to the wall panel.

10. The method of claim 7, wherein step (a) comprises providing a fastener plate mounted to the channel between the side walls, and wherein step (e) comprises mounting the equipment to the fastener plate.

11. The method of claim 7, wherein step (a) comprises providing a lip on each side wall spaced from the base wall.

12. The method of claim 7, wherein step (c) comprises aligning the distance between the center of one aperture to the center of another aperture to be approximately equal to the distance between the center of one rib to the center of another rib.

13. The method of claim 7, wherein step (a) comprises providing the height and width of the side wall edges of the apertures to be greater than the height and width of the ribs protruding from the panel.

* * * * *

UNITED STATES PATENT AND TRADEMARK OFFICE
CERTIFICATE OF CORRECTION

PATENT NO. : 7,318,302 B2  Page 1 of 1
APPLICATION NO. : 10/770779
DATED : January 15, 2008
INVENTOR(S) : R. Scott Opperman It is certified that error appears in the above-identified patent and that said Letters Patent is hereby corrected as shown below:

Title Page, Item (12):

Under "United States Patent" delete "Oppermanm" and insert --Opperman--

Title Page, Item (75):

delete "Oppermanm" and insert --Opperman--

Signed and Sealed this

Seventeenth Day of June, 2008

JON W. DUDAS
*Director of the United States Patent and Trademark Office*